July 15, 1941. W. F. HEROLD Re. 21,857

CHAIR IRON

Original Filed June 12, 1936

INVENTOR
WALTER F. HEROLD.
BY
Harris Mattern
ATTORNEY

Reissued July 15, 1941

Re. 21,857

UNITED STATES PATENT OFFICE 21,857

CHAIR IRON

Walter F. Herold, Bridgeport, Conn., assignor to The Bassick Company, Bridgeport, Conn., a corporation of Connecticut Original No. 2,106,174, dated January 25, 1938, Serial No. 84,837, June 12, 1936. Application for reissue July 15, 1939, Serial No. 284,752

11 Claims. (Cl. 155—77)

The present invention relates to an improvement in chair irons, particularly for use with tilting chair seats, and usually mounted for swivelling movement upon a base support.

An object of the invention is to provide a chair iron in which most of the parts may be formed of sheet metal bent to shape, which may be very inexpensively manufactured and in which the assembly may be carried out by simple and inexpensive manufacturing methods.

A further object is to provide a chair iron structure in which the parts of the structure which are subjected to strain will be supported by other parts in a manner to prevent any breakage or distortion thereof. Another object is to provide a chair iron in which the resilient means may be in the form of a resilient rubber block, or may be in the form of a helical spring, without otherwise altering the structure of the iron, and further to provide such resilient means which may be readily replaced by the user of the chair in the event of damaging, deterioration or breakage.

With the above and other objects in view embodiments of the invention are shown in the accompanying drawing and these embodiments will be hereinafter more fully described with reference thereto, and the invention will be finally pointed out in the claims.

In the drawing.

Similar reference characters indicate corresponding parts throughout the several figures of the drawing.

Figure 1:
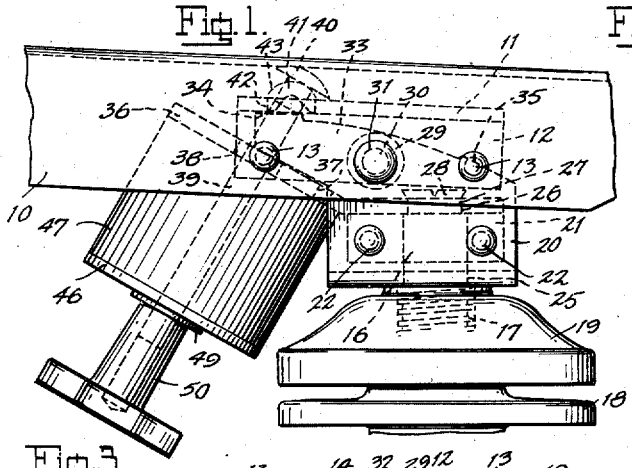
Fig. 1 is a side elevation of a chair iron embodying the present invention, end portions of the spider arms being broken away.
Figure 2:
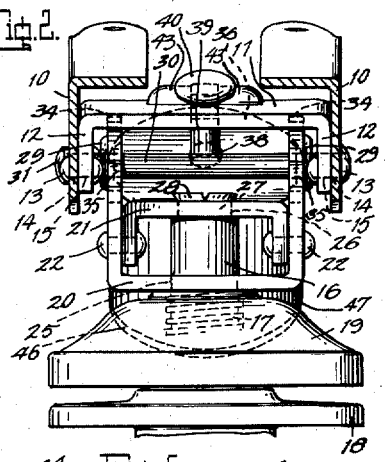
Fig. 2 is a rear end elevation, the spider arms being shown in section.
Figure 3:
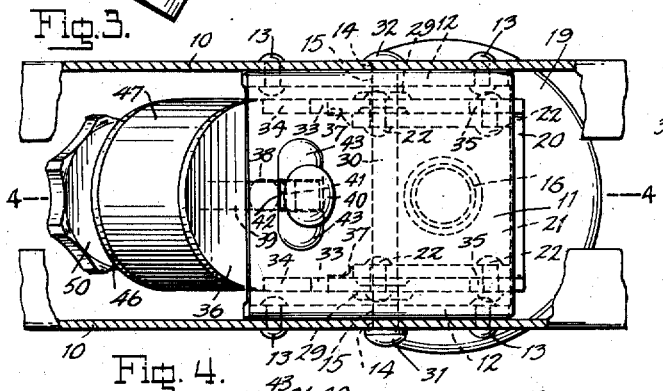
Fig. 3 is a top plan view, portions of the spider arm being broken away.
Figure 5:
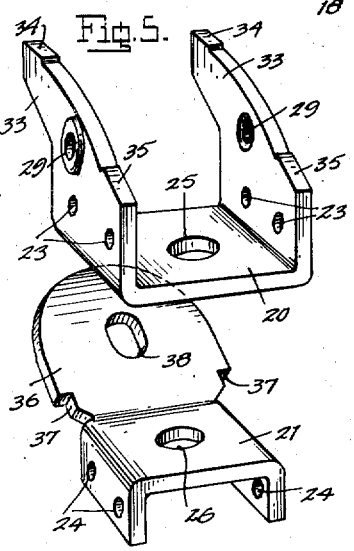
Fig. 5 is a perspective view of two of the frame parts of the structure in separated relation.
Figure 4:
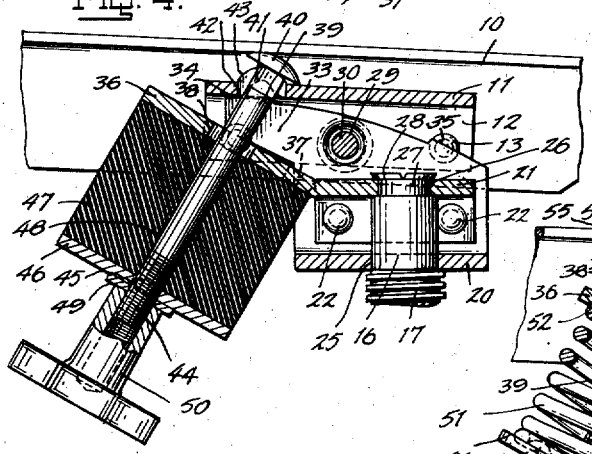
Fig. 4 is a vertical longitudinal sectional view taken along the line 4—4 of Fig. 3.

Referring to the drawing, and more particularly to Figs. 1 to 5, the chair iron, according to the illustrated exemplary embodiment of the invention, comprises a pair of angular cross-section spider arms 10—10 adapted to be screwed to the under side of the chair seat in the usual manner, and which are mounted for tilting movement upon the fixed part of the chair iron structure, as will presently more fully appear.

The spider arms are rigidly connected in separated relation by means of a spanner element, preferably formed of sheet metal, comprising a top portion 11 of rectangular outline provided at each side with right angularly bent flanges 12—12 secured by rivets 13 to the sides of the spider arms, there being aligned holes 14—14 and 15—15 in the sides of the spider arms and in the flanges 12—12 for receiving the shaft hereinafter more fully described, for tiltably connecting the spider arms to the fixed part of the chair iron.

The fixed part of the chair iron is rigidly mounted upon the upper end portion 16 of a vertically disposed spindle 17 which is screw threaded and mounted for vertical adjustment in the supporting base member 18, the vertical adjustment being accomplished by means of the nut 19. As these vertical adjustment parts form no part of the present invention, but are of well known construction, a further detail description of them is not deemed necessary.

The fixed part of the chair iron structure comprises a pair of channel shaped sheet metal members 20 and 21, the member 20 being of U-shape in cross-section, and the member 21 being of inverted U-shape in cross-section and fitted within the member 20, to which it is rigidly secured by means of rivets 22 engaging holes 23 and 24 respectively in the sides of the members 20 and 21. The transverse portion of the member 20 is provided with an aperture 25 engaged by the upper end portion 16 of the post 17, and the transverse portion of the member 21 is provided with an aperture 26 engaged by the reduced stud portion 27 formed upon the upper end of the portion 16 and headed over, as at 28, to thus rigidly secure the members 20 and 21 upon the post.

The sides of the member 20 extend above the transverse portion of the member 21 and are provided with apertured bearing portions 29—29, preferably embossed outwardly, and through which is engaged the tilting mounting shaft 30, the ends of this shaft being engaged in the apertures 14 and 15 of the spider arms and spanner member 11 and being secured thereto by the head 31 upon one end of the shaft and a riveted over head 32 upon the other end. The sides of the member 20 are also provided with forwardly projected inclined arms 33—33 provided upon their upper surfaces with forward stop portions 34—34 against which the spanner member 11 engages in the non-tilted position of the chair seat.

The upper edges of the side portions of the member 20 are also provided at their rearward ends with downwardly inclined stop portions 35—35, against which the spanner member is adapted to engage at the limit of the rearwardly tilted position of the chair seat, it being understood that the resilient element presently to be more fully described normally retains the chair seat in non-tilted position, the chair seat being tilted against the pressure of the resilient means.

The member 21 is provided at the forward end of its transverse portion with an extension 36 bent into an upwardly inclined plane and which constitutes an upper supporting head for the resilient element. The extension 36 is engaged and supported by the undersides of the arms 33—33, the rearward edge portions of the extension being notched, as at 37—37, to clear the forward edges of the sides of the member 20.

A slightly elongated hole 38 is provided in the extension through which the rod 39 extends. This rod is provided at its upper end with a head 40 below which there is a squared portion 41, which is engaged in a slot 42 provided in the spanner member 11, outwardly embossed rounded pillar portions 43—43 being provided at each side of this slot upon which the head 40 rockingly engages. The rod 39 is screw-threaded at its lower end, as at 44, and extends through the central aperture 45 of a plate 46, and between this plate 46 and the extension 36 there is disposed a cylindrical resilient rubber block 47, having a central passage 48 therethrough in which the rod 39 is engaged. A washer 49 and an adjustment and retaining nut 50 are provided upon the threaded end of the rod for retaining the plate 46 and cylindrical rubber element in place. Also by adjusting the nut 50 the initial tension in the rubber block may be adjusted as desired, so that more or less force will be required to tilt the chair seat against the pressure of the rubber block.

In operation, the spider arms and spanner member are tilted by the rearward pressure exerted by the person seated in the chair, this pressure causing the spider arms and the spanner member to tilt about the axis of the shaft 30 pulling the plate 46 toward the extension 36 and compressing the rubber block. It will be noted that the pressure exerted upon the extension 36 is taken upon the arms 33—33, so that there is no tendency for the extension 36 to bend with respect to the member 21, even though the latter may be constructed of relatively thin metal.

Figure 6:
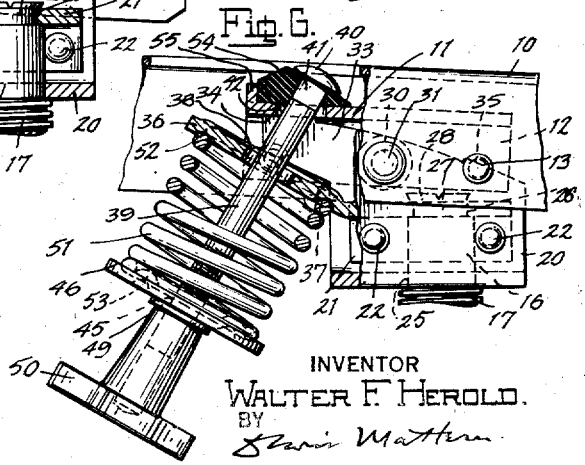
Fig. 6 is a view partially in side elevation and partially in vertical section of a modified form of the invention, in which the resilient element is in the form of a helical spring.

In Fig. 6, I have shown a modified form of the invention, in which a helical spring 51 is employed as the resilient element instead of the rubber block 47. In this case the extension member 36 is preferably provided with a circular recess 52 for positioning the upper end of the spring and the plate 46 is provided with an embossed circular rib 53 which positions the lower end of the spring. In this illustration I have also shown a modified form of pivot or rocking support for the upper end of the rod 39, and which consists of an apertured rubber block 54 disposed upon the upper side of the spanner member 11 above the slot 42, the spanner member being provided at its forward end with an upwardly bent flange 55 for retaining the rubber block. It will be understood that this type of rubber support may be used in the embodiment illustrated in Figs. 1 to 5, and that the embossed support illustrated in Figs. 1 to 5 may be used in the embodiment illustrated in Fig. 6.

In this form, the rod passes with clearance through the frame and the spanner member, and has end portions extending beyond them, said end portions being surrounded by resilient members, and there are elements on the end portions of the rod holding the respective resilient members in position against the respective members of the frame-spanner structure with the rod under tension. One end of the rod is not only tiltably held but held in a resilient manner from the spanner member for free swinging and translating movements within certain limits. The block 54 provides means for tiltably and resiliently holding one end of the rod. The rearward tilting of the chair seat causes a pull on the rod through the resilient member adjacent the spanner member, which pull acts to compress the other resilient member.

I have illustrated and described preferred and satisfactory embodiments of the invention, but it will be obvious that changes may be made therein, within the spirit and scope thereof, as defined in the appended claims.

What I claim is:

1. In a chair iron structure, a supporting post, a frame rigidly mounted on said post, a pair of spider arms, a spanner member rigidly connecting said spider arms in spaced relation, said spanner member having a slot, an apertured rubber block disposed at the upper side of said spanner member, its aperture registering with said slot, joint means connecting said spider arms and spanner member to said frame for tilting movement about a horizontal axis, an apertured resilient element supporting head rigidly connected to said frame, a rod extending through said slot of said spanner member and the aperture of said block and extending through said apertured head, a head on said rod resiliently supported by said rubber block, a resilient element supporting base adjustably mounted on said rod in spaced relation to said apertured supporting head, and resilient means disposed about said rod between said apertured head and said base.

2. In a chair iron structure, a supporting post, a frame rigidly mounted on said post, a pair of spider arms, a spanner member rigidly connecting said spider arms in spaced relation, joint means connecting said spider arms and spanner member to said frame for tilting movement about a horizontal axis, said frame comprising a U-shaped frame member, a second frame member secured between the sides of said first frame member, forwardly projecting arms forming a continuation of the sides of said U-shaped frame member adapted to engage said spanner member in the non-tilted position of said spider arms, stops means on said arms adapted to engage said spanner member to limit the tilted position of said spider arms, a forwardly projecting integrally formed apertured resilient element supporting head on said second frame member engaging the under sides of said arms, a rod rockingly connected to said spanner member and extending through said apertured head, a resilient element supporting base adjustably mounted on said rod in spaced relation to said head, and resilient means disposed about said rod between said head and said base.

3. In a chair iron structure, a supporting post, a frame rigidly mounted on said post, a pair of spider arms, a spanner member rigidly connecting said spider arms in spaced relation, joint means connecting said spider arms and spanner member to said frame for tilting movement about a horizontal axis, said frame comprising a U-shaped frame member, an inverted U-shaped member secured between the sides of said U-shape member, forwardly projecting arms forming a continuation of the sides of said U-shaped frame member adapted to engage said spanner member in the non-tilted position of said spider arms, stop means on said arms adapted to engage said spanner member to limit the tilted position of said spider arms, an apertured resilient element supporting head integrally formed on said inverted U-shaped member engaging the under sides of said arms, a rod rockingly connected to said spanner member and extending through said apertured head, a resilient element supporting base adjustably mounted on said rod in spaced relation to said head, and resilient means disposed about said rod between said head and said base.

4. In a chair iron structure, a supporting post, a frame rigidly mounted on said post, a pair of spider arms, a spanner member rigidly connecting said spider arms in spaced relation, joint means connecting said spider arms and spanner member to said frame for tilting movement about a horizontal axis, said frame comprising a U-shaped frame member having an aperture in its transverse portion engaged by said post, a second frame member secured between the sides of said first frame member and having an aperture in its transverse portion also engaged by said post, said post being secured with respect to said apertures against vertical displacement, forwardly projecting arms on the sides of said U-shaped frame member adapted to engage said spanner member in the non-tilted position of said spider arms, stop means on said arms adapted to engage said spanner member to limit the tilted position of said spider arms, a forwardly projecting integrally formed apertured resilient element supporting head on the transverse portion of said second frame member engaging the under sides of said arms, a rod rockingly connected to said spanner member and extending through said apertured head, a resilient element supporting base adjustably mounted on said rod in spaced relation to said head, and resilient means disposed about said rod between said head and said base.

5. In a chair iron structure, a supporting post, a frame rigidly mounted on said post, a pair of spider arms, a spanner member rigidly connecting said spider arms in spaced relation, joint means connecting said spider arms and said spanner member to said frame for tilting movement about a horizontal axis, said spanner member having a slot therein, an apertured rubber block disposed at that side of said spanner member which is remote from said frame and having its aperture registering with said slot, an apertured resilient element supporting head rigidly connected to said frame, a rod passing through said slot of said spanner member and the aperture of said block and extending through said apertured head, a terminal member on said rod resiliently supported by said rubber block, a resilient element supporting base adjustably mounted on said rod in spaced relation to said apertured supporting head, and a resilient element disposed about said rod between said head and said base.

6. In a chair iron structure, a supporting post, a frame rigidly mounted on said post, a pair of spider arms, a spanner member rigidly connecting said spider arms in spaced relation, hinge means connecting said spanner member to said frame for tilting movement about a horizontal axis, said spanner member and said frame having spaced parts facing each other and provided with apertures or slots, a rod passing through said apertures or slots with clearance and disposed partially in the space between the spaced parts, a terminal member on said rod at the remote side of the spanner member with respect to the frame, a rubber member surrounding the rod and supporting the terminal member so as to act as a pivoting support for the rod end, flange means carried by the spanner member for preventing dislocation of said rubber member, a resilient compression member surrounding the rod at that side of the frame which is remote from the spanner member, and means on the rod at the last-named side of the frame for adjusting the compression of said compression member.

7. In a chair iron structure, a post-supported frame, a chair-seat-attached spanner member hinged to said frame for tilting movement about a horizontal axis, said spanner member having a clearance opening therein and said frame member having a resilient element supporting head disposed somewhat forwardly with respect to the spanner member and itself provided with a clearance opening, a rod passing through said openings and having a substantial portion of its length on that side of the frame which is remote from the spanner member, a resilient compression member surrounding the rod at the last-named portion thereof, a member surrounding the outer end portion of the rod for positioning the outer end of said compression member, means including a turnable member on the outer end portion of the rod for changing the compression of said compression member, an abutment associated with the other extremity of the rod, and a rubber member disposed about the rod on the far side of the spanner member providing a cushioned tilting mounting for said abutment taking the working tension of the device.

8. In a chair iron structure, a post-supported frame, a chair-seat-attached spanner member hinged to said frame for tilting movement about a horizontal axis, said spanner member and said frame having spaced parts facing each other and provided with clearance openings, the facing part of said frame being disposed somewhat forwardly of the facing part of said spanner member, a rod passing with clearance through said openings and having a portion between said spaced parts and other portions beyond and outside said parts, two resilient members surrounding said rod in those parts which are beyond and outside of the spanner member and the frame, means associated with the spanner member and the frame respectively for positioning the adjacent resilient members, an abutment member on the rod supported under the working tension of the device by the resilient member which is on the far side of the spanner member, and means associated with the end of the rod on the far side of the frame for varying the compression of the other resilient member, the structure providing for free translating movements of the rod as the chair seat is tilted.

9. In a chair iron structure, a post-supported frame, a chair-seat-attached spanner member hinged to said frame for tilting movement about a horizontal axis, said spanner member and said frame having spaced parts by facing each other and provided with clearance openings, the facing part of said frame being in the form of an integral resilient element supporting head disposed somewhat forwardly of the facing part of the spanner member, a rod passing through said openings and having a portion between said spaced parts and other portions beyond and outside said parts of which the forward portion is the longer, a resilient compression element surrounding said rod in front of and positioned by said supporting head, a resilient element supporting base on the front end portion of said rod, means on the front end portion of the rod for regulating the compression of said resilient element, and means for mounting the other end of the rod tiltably with respect to the spanner member and supporting it against the working tension comprising a smaller resilient element positioned against that side of the spanner member which is remote from the frame and resiliently supporting an abutment on said end of the rod.

10. In a chair iron structure, a post-supported frame, a chair-seat-attached spanner member hinged to said frame for tilting movement about a horizontal axis, and a counterbalancing device including a translatably mounted rod passing with clearance in a generally forwardly and rearwardly direction through parts of the frame and spanner member and movably and yieldingly mounted at its rear end portion with respect to the spanner member to support the rod under working tension, and a front resilient compression element and compression-regulating member mounted on and swinging with the rod.

11. In a chair iron structure, a frame and a spanner member hinged thereto, a rod passing with clearance through said parts and having end portions extending beyond them, resilient members surrounding said end portions, and elements on the end portions of the rod holding the respective resilient members in position against the respective members of the frame-spanner structure with the rod under tension and tiltably and resiliently held at one end from the spanner member for free swinging and translating movements, the rearward tilting of the chair seat causing a pull on the rod through the resilient member adjacent the spanner member which pull acts to compress the other resilient member.

WALTER F. HEROLD.